(12) United States Patent
Bocks et al.

(10) Patent No.: US 10,661,933 B2
(45) Date of Patent: May 26, 2020

(54) SEALING BAR FOR A VACUUM DRAWER AND VACUUM DRAWER

(71) Applicant: Michatek k.s., Michalovce (SK)

(72) Inventors: Stefan Bocks, Frasdorf (DE); Florian Harlander, Niederndorf (AT); Peter Kopfensteiner, Ebbs (AT)

(73) Assignee: Michatek k.s., Michalovce (SK)

( * ) Notice: Subject to any disclaimer, the term of this patent is extended or adjusted under 35 U.S.C. 154(b) by 388 days.

(21) Appl. No.: 15/234,190

(22) Filed: Aug. 11, 2016

(65) Prior Publication Data
US 2017/0043893 A1 Feb. 16, 2017

(30) Foreign Application Priority Data
Aug. 11, 2015 (DE) .................. 10 2015 010 433

(51) Int. Cl.
| | |
|---|---|
| *B65B 51/22* | (2006.01) |
| *B65B 31/02* | (2006.01) |
| *B65B 65/00* | (2006.01) |
| *B29C 65/00* | (2006.01) |
| *B29C 65/22* | (2006.01) |
| *B65B 51/14* | (2006.01) |
| *B29L 31/00* | (2006.01) |

(52) U.S. Cl.
CPC ............ *B65B 51/22* (2013.01); *B29C 65/224* (2013.01); *B29C 65/229* (2013.01); *B29C 66/1122* (2013.01); *B29C 66/43121* (2013.01); *B29C 66/8167* (2013.01); *B29C 66/8324* (2013.01); *B29C 66/849* (2013.01); *B65B 31/024* (2013.01); *B65B 51/146* (2013.01); *B65B 65/00* (2013.01); *B29C 66/00145* (2013.01); *B29L 2031/7128* (2013.01)

(58) Field of Classification Search
CPC ... B29C 65/224; B29C 65/229; B29C 66/849; B29C 66/8167; B29C 66/43121; B29C 66/8324; B29C 66/00145; B29C 66/1122; B65B 31/024; B65B 51/22; B65B 51/146; B65B 65/00; B29L 2031/7128
See application file for complete search history.

(56) References Cited

U.S. PATENT DOCUMENTS

| | | | | |
|---|---|---|---|---|
| 2,963,838 | A * | 12/1960 | Harrison | B65B 31/06 219/243 |
| 3,253,122 | A * | 5/1966 | Kochmer | B29C 65/229 156/251 |
| 3,912,575 | A * | 10/1975 | Zelnick | B29C 65/223 156/515 |
| 3,958,391 | A | 5/1976 | Kujubu | |

(Continued)

FOREIGN PATENT DOCUMENTS

| | | |
|---|---|---|
| DE | 25 52 342 A1 | 8/1976 |
| DE | 10 2013 014 656 A1 | 3/2015 |
| JP | 10-258808 A | 9/1998 |

*Primary Examiner* — Chelsea E Stinson
*Assistant Examiner* — Thomas M Wittenschlaeger
(74) *Attorney, Agent, or Firm* — Dilworth & Barrese, LLP

(57) ABSTRACT

The invention relates to a sealing bar for a vacuum drawer for vacuuming food, having a base support which comprises at least one welding wire extending in the longitudinal direction over the surface, with the welding wire being fastened to the base support by means of a clamping connection at one side or at both sides.

11 Claims, 7 Drawing Sheets

(56) References Cited

U.S. PATENT DOCUMENTS

| | | | | |
|---|---|---|---|---|
| 4,045,272 A * | 8/1977 | Lombardi | ............ | B29C 66/8324 |
| | | | | 156/274.2 |
| 4,610,653 A * | 9/1986 | Savich | ................. | B29C 65/229 |
| | | | | 156/515 |
| 5,239,808 A * | 8/1993 | Wells | .................... | B29C 65/228 |
| | | | | 53/373.7 |
| 6,789,371 B1 * | 9/2004 | Buysman | .............. | B29C 65/229 |
| | | | | 53/373.7 |
| 7,759,611 B2 * | 7/2010 | Cheney | ................. | B29C 65/229 |
| | | | | 156/229 |
| 8,124,915 B2 * | 2/2012 | Bertram | .............. | B29C 65/7894 |
| | | | | 219/243 |
| 2008/0302253 A1 * | 12/2008 | Salvaro | .................. | F24C 15/00 |
| | | | | 99/325 |
| 2010/0116809 A1 * | 5/2010 | Cheney | ................. | B29C 65/229 |
| | | | | 219/240 |

\* cited by examiner

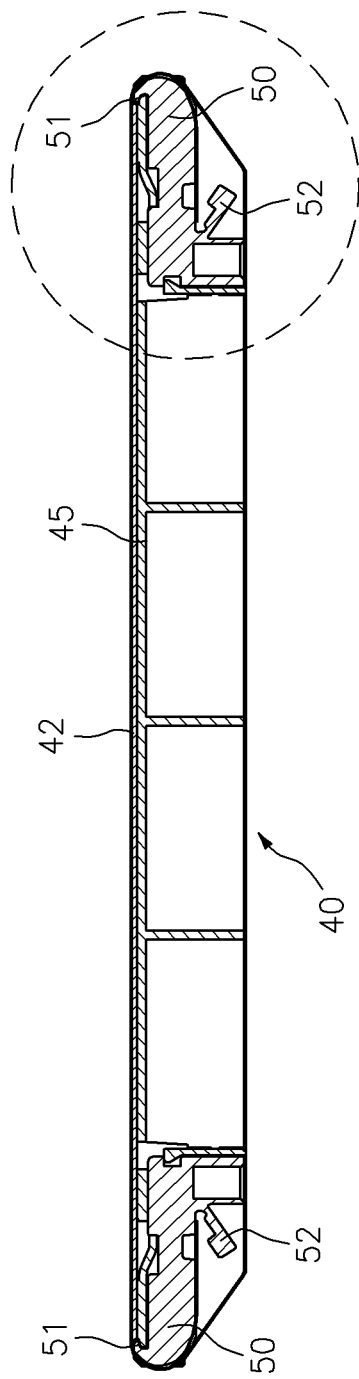
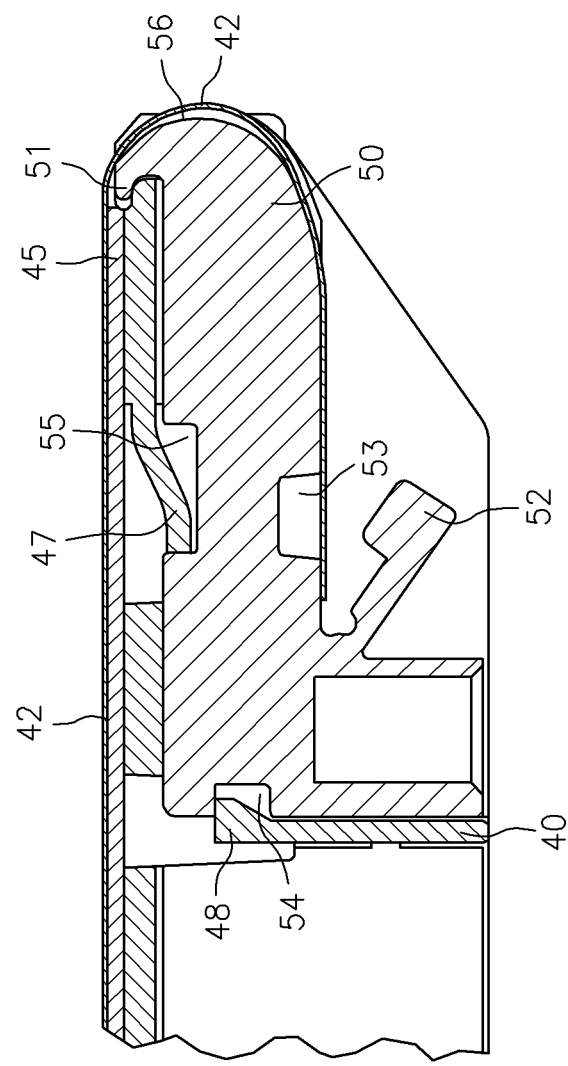
FIG. 5a
FIG. 5b

SEALING BAR FOR A VACUUM DRAWER AND VACUUM DRAWER

BACKGROUND OF THE INVENTION

The invention relates to a sealing bar for a vacuum drawer for vacuuming food, having a base support which comprises at least one welding wire extending in the longitudinal direction over the surface. The invention further relates to a vacuum drawer having a corresponding sealing bar.

Vacuuming units comprise a vacuum pump into which a suitable container, for example in the form of a sealable bag, is placed. A sealing bar which is vertically adjustable in the vertical direction extends within the chamber. The container filled with food is placed into the vacuum chamber, the latter subsequently being closed in an airtight manner via a cover to generate a chamber vacuum by means of a vacuum pump. Since the sealing bar is first positioned in an open position, the air can also be sucked out of the container. The sealing bar is subsequently vertically adjusted and the bag is clamped between the sealing bar and the counterpart. The bag is sealed due to the heat development by supplying the required welding energy.

It must be ensured for the welding process that the welding wire is uniformly contacted since otherwise local overheating of the welding wire and corresponding damage may occur. Since a uniform contact may not be able to be ensured under certain circumstances on a heat-induced lengthening of the welding wire, a corresponding spring element was previously integrated to compensate the lengthening.

SUMMARY OF THE INVENTION

The subject of the present invention deals with the object of providing an alternative fixing of the welding wire to the base support of the sealing bar.

This object is achieved by the sealing bar in accordance with the features herein. Advantageous embodiments of the sealing bar are the subject of the description herein.

In accordance with the invention, it is proposed with the sealing bar of the category having base support which comprises at least one welding wire extending in a longitudinal direction over the surface to fasten the welding wire to the base support with a preload such that the latter lies areally over its total length on the base support. Due to the preload it is ensured, that the heating wire has an areal contact everywhere and the heat can be dissipated. The heating wire would otherwise overheat at the position without heat dissipation.

The heating wire is ideally fastened indirectly or directly to the base support at one side or at both sides via a clamping connection. The welding wire can be flexibly fastened to the base support with a certain preload due to the clamping connection of the welding wire to the base support, preferably by clipping the ends of the welding wire into corresponding clamps. The preload provides that uniform contact between the welding wire and the environment, i.e. the base support, is also ensured on a heat-induced lengthening of the welding wire.

The welding wire is preferably led to the lower side via the transverse edges of the base support and is fixed thereto at the lower side by means of a clamping connection. The base support preferably comprises radii at the end sides about which the welding wire extends with areal contact.

The fixing to the base body preferably takes place by means of clamping means; a respective separate clamping means is preferably provided per free end of the welding wire. The welding wire itself is fixed to the clamping means at the end side via a clamping connection. The fastening of the clamping means to the base body can basically take place in any desired manner; however, a releasable connection of the clamping means to the base support is preferred.

In accordance with a preferred embodiment variant, the fastening of the one or more clamping means to the base support takes place via at least one hook of the clamping means. Said hook can be hung at the base support. The clamping means is preferably fixed below the surface of the base support and the hook is hung at the transverse edge of the surface of the base support.

Provision can additionally be made that one or more latching hooks are provided at the base element below its surface which latch into corresponding cut-outs of the clamping means and thus allow a shape-matched connection between the base support and the clamping means.

It is a particular advantage of the embodiment with the aid of the clamping means in this respect that the clamping means can be used to achieve a lever effect or a wedge effect. A sufficient preload of the clamped welding wire is achieved automatically by hooking in the clamping means and by attaching them to the lower side of the base support, preferably by a rotational movement with the hook connection as an axis of rotation.

The clamping means preferably consist of an electrically conductive material or at least comprise an electrically conductive material, preferably a conductive metal.

The clamping means in this case simultaneously serve as connection points for the electrical supply of the welding wire. A corresponding opening on the lower side of the clamping means is conceivable which can be plugged onto corresponding connection spigots on the installation of the sealing bar within a vacuum drawer.

The clamping means advantageously comprise a groove for providing the clamping connection and the welding wire can be pressed into said groove by a pressing part of the clamping means. The pressing part itself can be arranged movably, in particular flexibly, at the clamping means.

In addition to the sealing bar in accordance with the invention, the present invention additionally relates to a vacuum drawer, in particular for installation into a piece of furniture, having a vacuum chamber and at least one sealing bar in accordance with the present invention supported in the vacuum chamber. The advantages and properties of the vacuum drawer in accordance with the invention thus correspond to those of the sealing bar in accordance with the invention. A repetitive description is dispensed with for this reason.

BRIEF DESCRIPTION OF THE DRAWINGS

Further advantages and properties of the invention will be explained below in detail with reference to an embodiment shown in the Figures. There are shown:

FIG. 5a: a sectional representation of the base support along the longitudinal axis;

FIG. 5*b*: a detailed view of the representation in accordance with FIG. 5*a*, and FIG. 6: an exploded representation of the base support of the sealing bar.

DESCRIPTION OF THE PREFERRED EMBODIMENTS

Figure 1A:
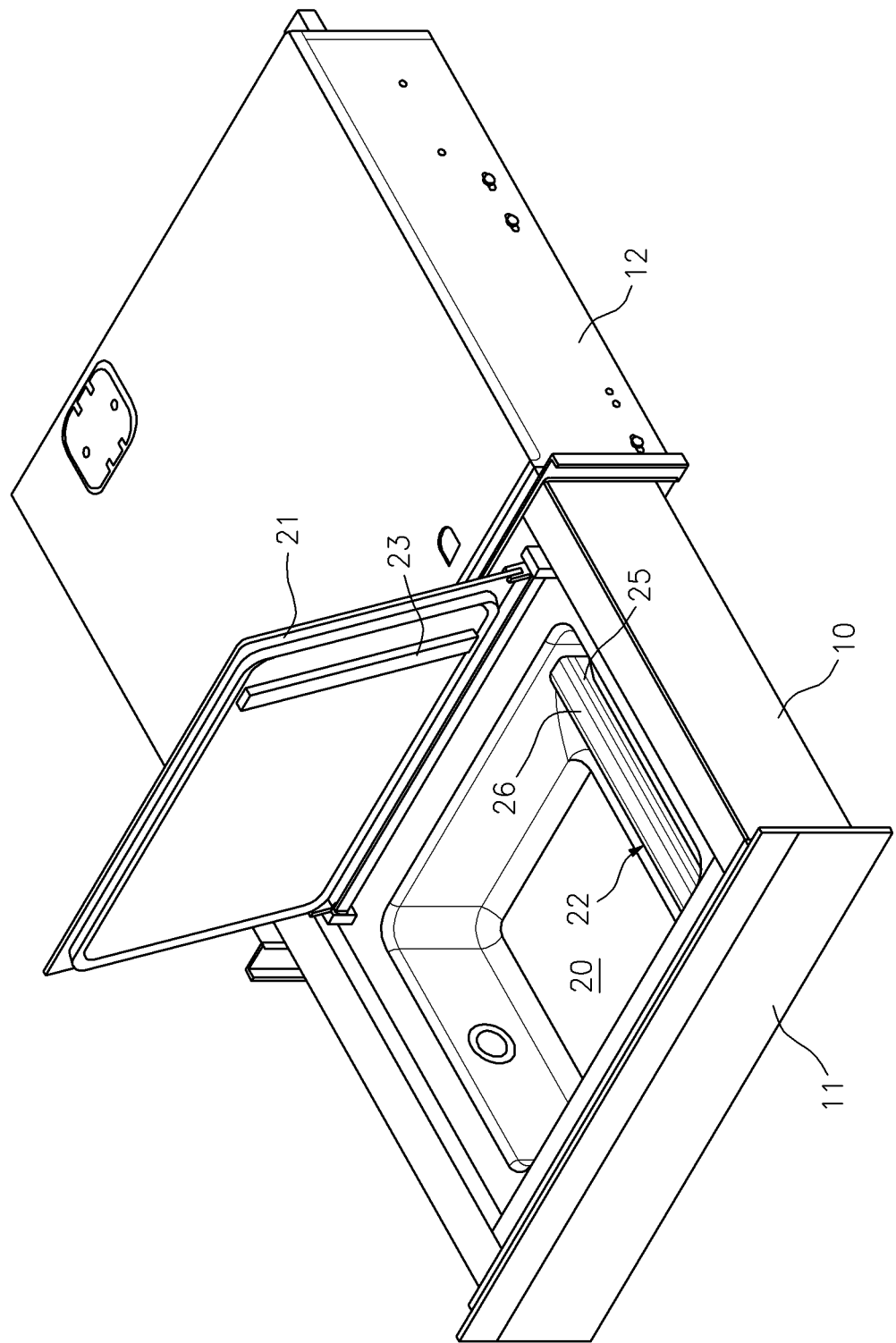
FIGS. 1a, 1b: two isometric representations of the vacuum drawer in accordance with the invention.
Figure 1B:
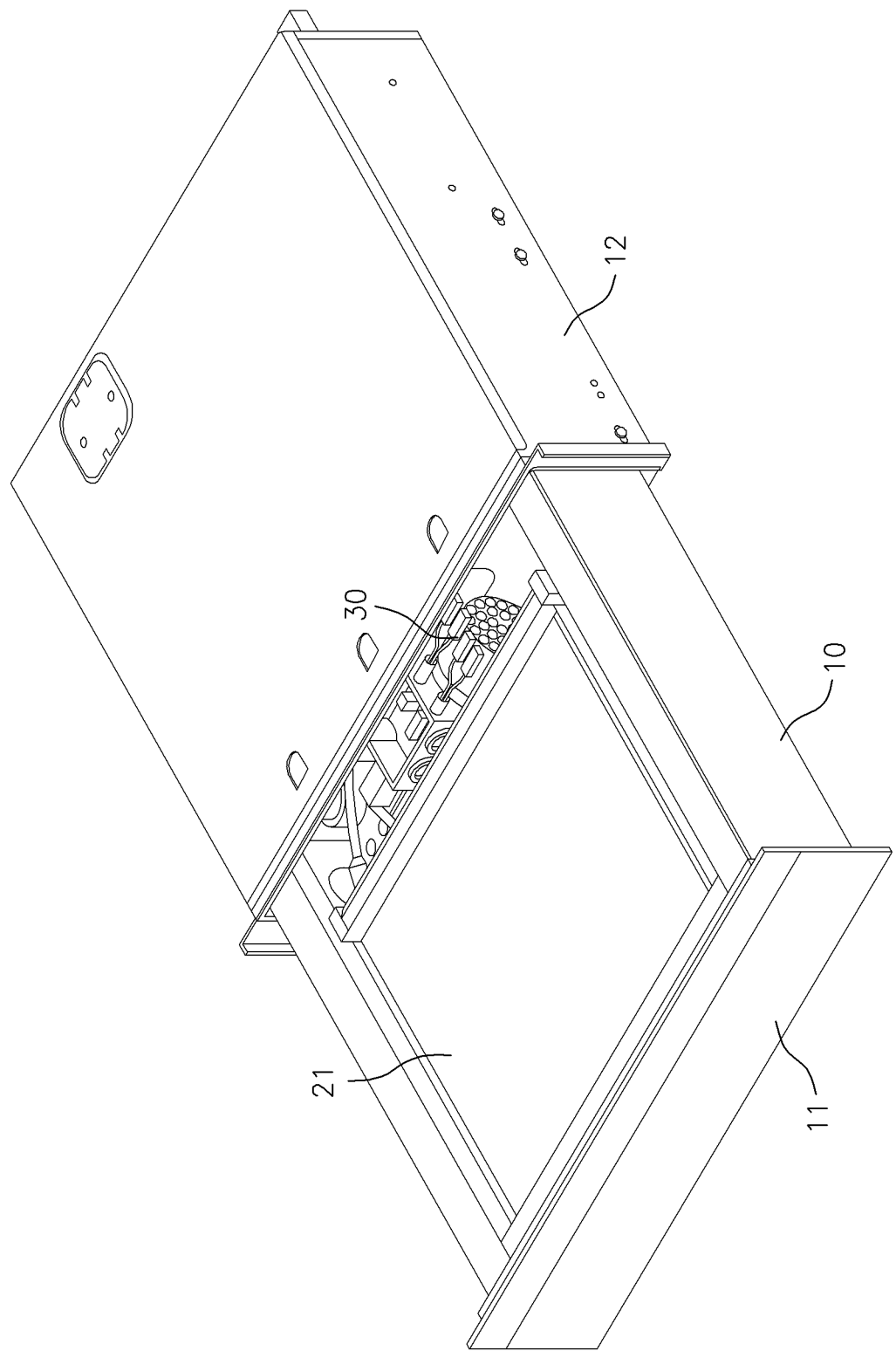

The two FIGS. 1*a*, 1*b* show isometric representations of the vacuum drawer in accordance with the invention. The representation of FIG. 1*a* shows the pulled out drawer for regular vacuuming operation. The drawer has been pulled out a little further again for maintenance purposes in FIG. 1*b* to allow a view of the vacuum pump 30. The drawer is suitable for use in a piece of kitchen furniture since it is characterized by an installation height of approximately 140 mm and accordingly corresponds to the standard dimension of fitted kitchens.

The vacuum drawer comprises a drawer extension 10 which is longitudinally displaceably guided over lateral guide rails in a drawer carcass 12. In the embodiment shown, the front cover 11 is handle-less and the drawer extension is designed as a push-pull device for opening and closing. A vacuum chamber 20 is supported within the drawer extension and is coupled fluidically to a vacuum pump 30 of the vacuum drawer to pump the air out of the closed vacuum chamber 20. The vacuum chamber 20 can be closed in an airtight manner via the cover 21 pivotably mounted to the chamber 20. The cover 21 itself can be produced from glass for design reasons.

A sealing bar 22, which extends in the chamber interior in the extension direction of the drawer, serves for the sealing of an inserted bag. A bag filled with food is placed into the chamber 20 for vacuuming and the cover 21 is closed in an airtight manner. The bag can be sealed by means of the sealing bar 22 after the evacuation of the chamber 20 by means of the vacuum pump 30 visible in FIG. 1*b*. The bag opening to be sealed is then placed onto the sealing bar 22 which presses the bag against a contact point after the vacuuming and seals it by the effect of heat. The bar 22 can be pressed either to a counter-pressing bar 23 fastened to the cover 21 or against an alternative pressing surface. The vacuum pump 30 is seated behind the chamber 20 at the rear part of the drawer extension 10 and is coupled fluidically to the vacuum chamber 20 to pump the air out of the chamber 20 to generate the vacuum.

Figure 2:
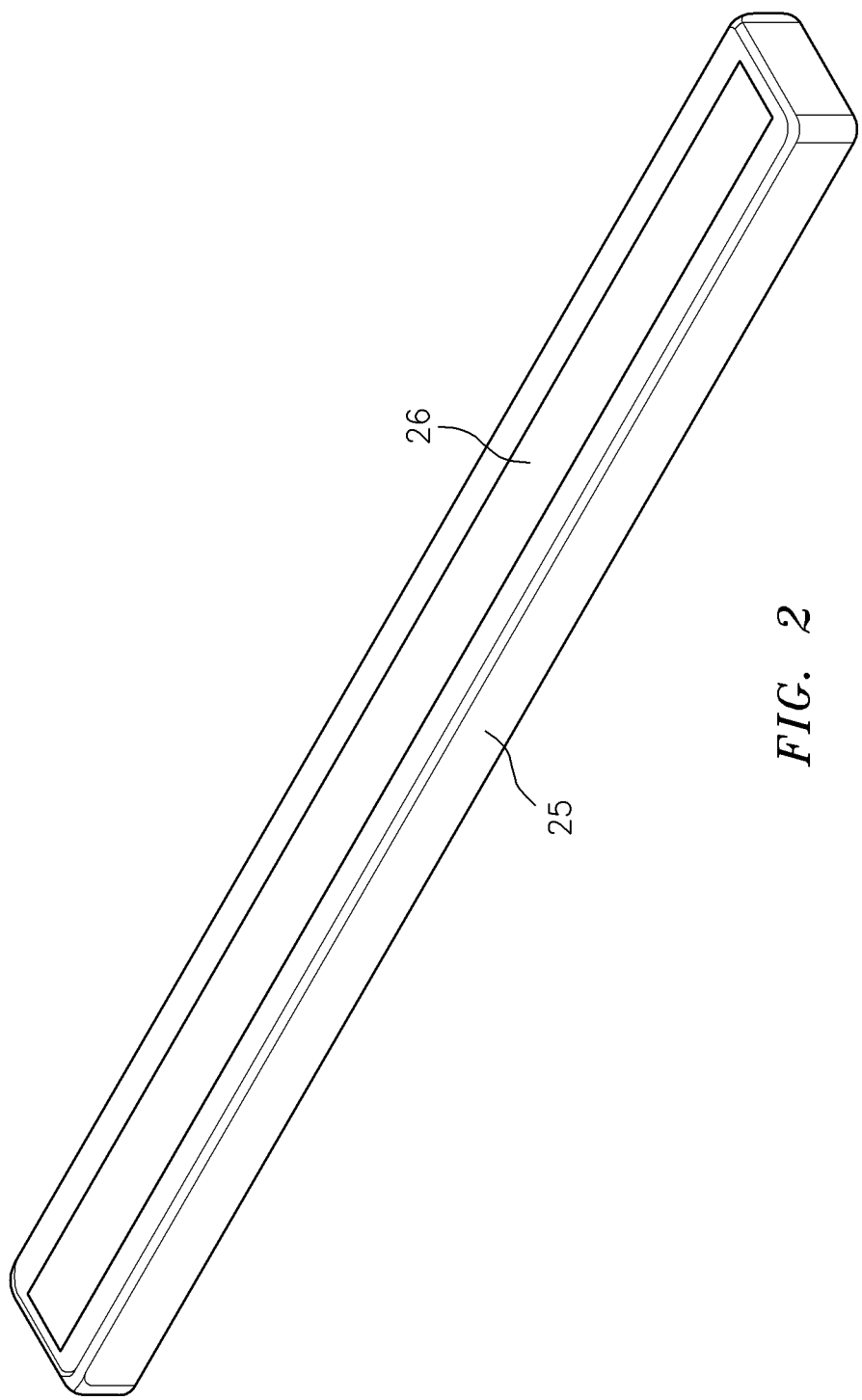
FIG. 2: a perspective view of the frame part of the sealing bar in accordance with the invention.

The sealing bar 22 comprises a base body 40 as well as a frame part 25 which is equipped with a Teflon tape 26. On the sealing procedure, the sealing bar 22 contacts the inserted bag via the Teflon tape 26 and the heat produced by the welding wire 42 is output to the bag via the Teflon tape 26. FIG. 2 shows a perspective representation of the frame part 25 for the sealing bar 22 in accordance with the invention. The frame part 25 comprises the Teflon tape 26 which extends almost completely over the surface of the sealing bar 22 in its longitudinal direction.

The two-part design of the sealing bar 22 comprising the base body 40 and the frame part 25 allows a fast, simple and inexpensive replacement of the Teflon tape 26. Either the total frame part 25 or only the Teflon tape 26 can be replaced.

Figure 3:
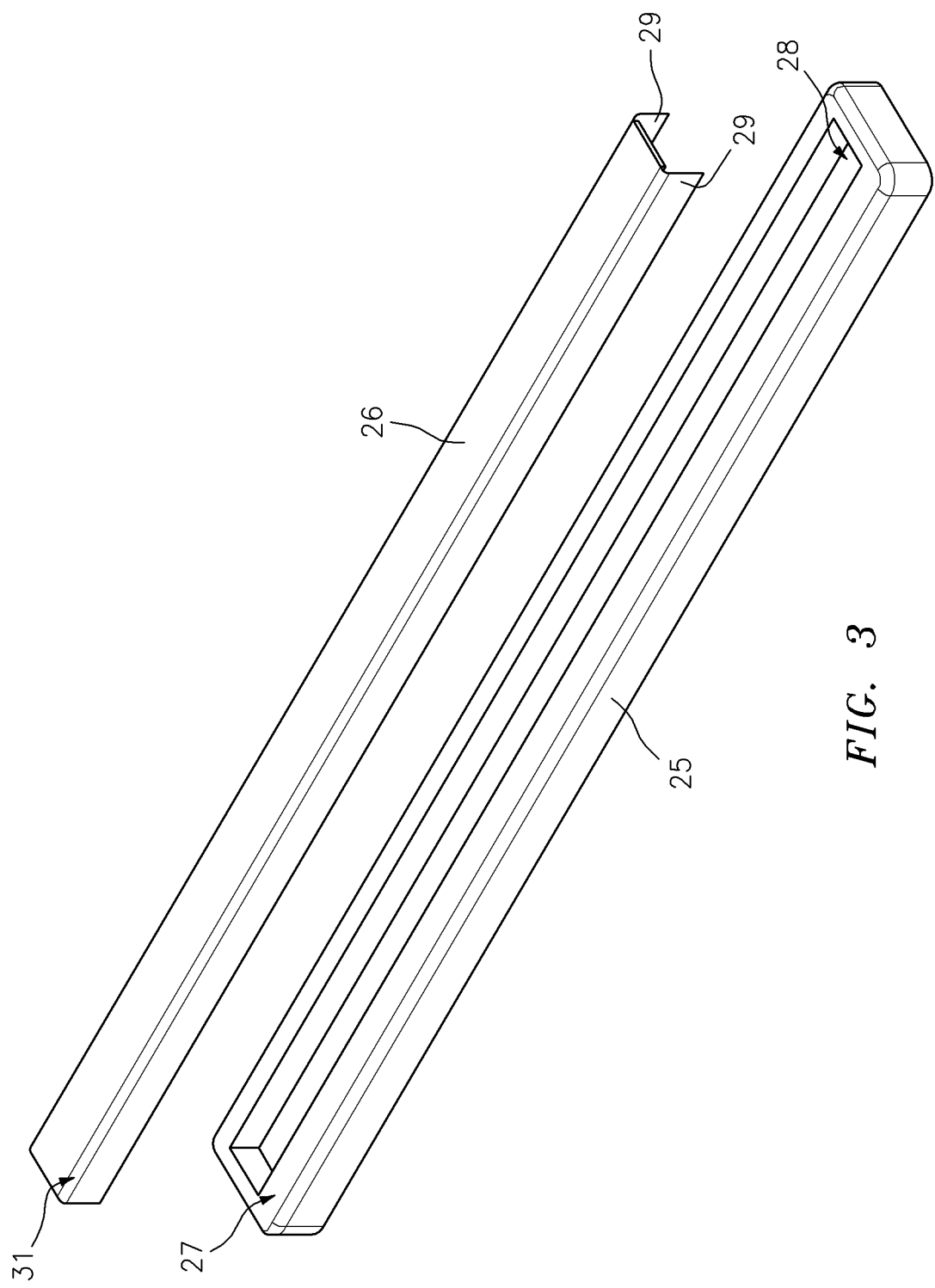
FIG. 3: the frame part of FIG. 2 in an exploded representation.

The exploded representation of FIG. 3 shows the complete Teflon tape 26 as well as the nature of the surface of the frame part 25. The frame part 25 comprises a cut-out 28 on its surface 27 onto which a bag to be correspondingly sealed is placed during the sealing process. The longitudinal edges 29 of the Teflon tape 26 are folded downwardly and the resulting width of the Teflon tape 26 thus approximately corresponds to the opening width of the cut-out 28. The Teflon tape 26 can thereby be inserted into the opening 28 and an almost stepless surface 27 of the frame 25 is produced with an extremely small offset at the transition between the frame part 25 and the Teflon tape 26.

The folding edge 31 of the Teflon tape 26 is, however, not a simple edge, but the fold rather forms a curved, step-like section 31. The exact extent of the section can be seen from the cross-sectional representation of FIG. 4. Due to the selected section shape 31, the Teflon tape 26 can lie tightly at the two sealing lips 32 of the frame part 25 which each extend along the longitudinal edges of the opening 28. The sealing lips 32 reduce the offset in the transition between the frame part 25 and the Teflon tape 26 such that the risk of contamination at the transition is minimized.

Figure 4:
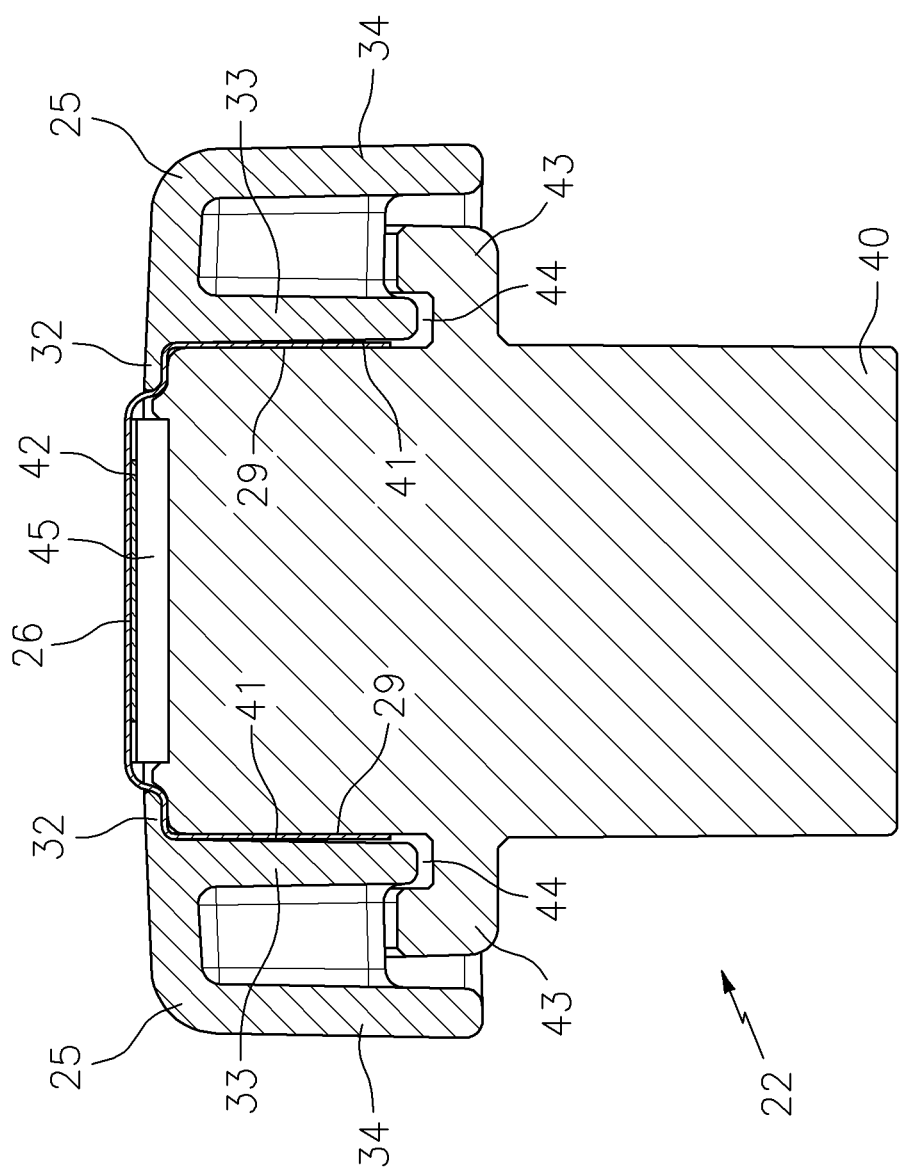
FIG. 4: a sectional representation of the sealing bar in accordance with the invention transversely to its longitudinal axis.

It can furthermore be seen from FIG. 4 that the frame part 25 is placed on the base support 40 of the sealing bar 22 from above. An inner wall 33 projects inwardly or downwardly into the sealing bar 22 in the region of the opening edges of the opening 28 of the frame part 25, whereby an opening wall is formed. This inner wall 33 extends in parallel with the oppositely disposed side wall 41 of the base support 40. The inner wall 33 moreover extends in parallel with the respective outer wall 34 of the frame part 25. There is a gap between the inner wall 33 and the outer wall 34.

The welding wire 42 extends in the longitudinal direction on the surface 45 of the base support 40. If the frame part 25 is placed onto the base support 40 from above, the welding wire 42 is disposed directly below the Teflon tape 26, whereby an ideal heat transfer is produced. The Teflon tape 26 can be fixed to the sealing bar 22 by a clamp connection. For this purpose, the folded longitudinal edges 29 are clamped between the side wall 41 of the base support 40 and the inner wall 33 of the frame part 25. A sealing clamping likewise takes place with the surface of the base support 40 in the region of the sealing lips 32. The Teflon tape 26 can moreover additionally be adhesively bonded to the frame part 25 or can be fastened thereto in a different manner.

On the placing of the frame part 25 onto the base support 40, the lower edge of the inner wall 33 is clipped at the end side into the groove 44 of the base support 40 formed by the projection 43.

Figure 6:
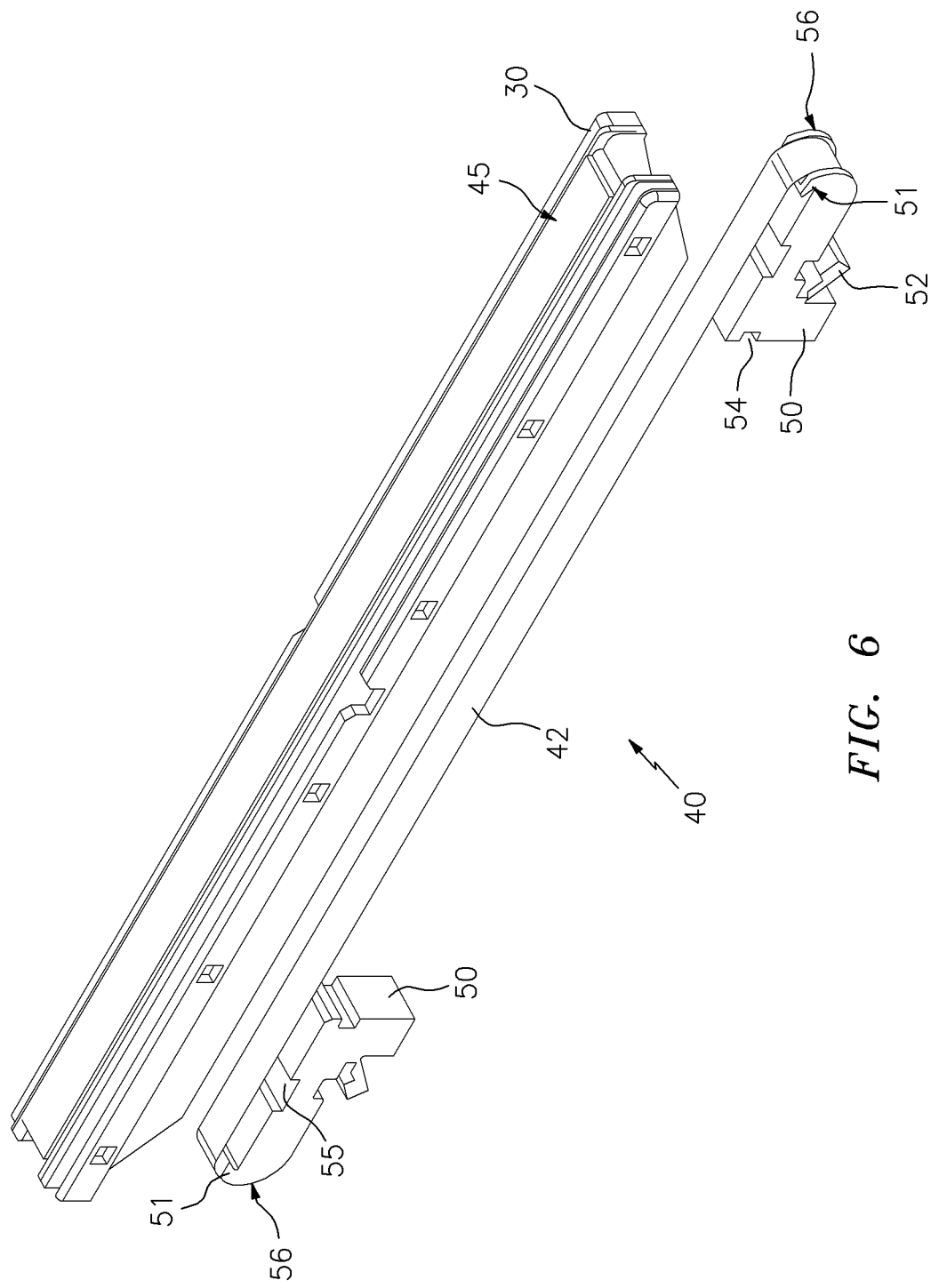

The fastening of the welding wire 42 to the base support 40 will be explained in more detail in the following with reference to FIGS. 5*a*, 5*b* and 6. FIG. 6 shows an exploded representation of the base support 40, while FIG. 5*a* shows a longitudinal section through the base support 40. FIG. 5*b* represents a detailed section of the right hand side of the base support 40 of FIG. 5*a*.

The welding wire 42 is clamped in the longitudinal direction over the total surface 45 of the base support 40, with the free welding wire ends being guided over the end edges of the base support 40 at its lower side. The fixing of the welding wire 42 to the base support 40 is achieved using clamping means 50. They are produced from an electrically conductive material and simultaneously represent the connection points of the sealing bar 22 for the electric supply.

A hook 51, which is formed by the rounded end edge 56 of the clamping means 50, is located at the upper side of the clamping means 50. A groove 53 as well as a plug 52 which is flexibly fastened to the clamping means and which can be pressed into the groove 53 with an exact fit is located at the lower side of the clamping means 50. A cut-out 55 is located at the upper side of the clamping means 50 and a further cut-out 54 is present at the rear side of the clamping means 50. The free ends of the welding wire 42 are placed downwardly from the upper side over the groove 53 via a respective rounded end side 56 of the clamping means 50 and are clampingly fixed to the clamping means 50 by pressing the plug 52 into the groove 53.

The two clamping means can subsequently be hung at the base support 40 at the end side via the hooks 51. The hooks are preferably hung in at the base support from above and are subsequently pressed below the lower side of the base support by an inward rotational movement. A sufficient tension of the welding wire is thus achieved by the lever effect associated therewith so that said welding wire extends uniformly and in a planar manner over the upper side 45 of the base support 40. The preload is selected such that a uniform contact also takes place with a heat-induced lengthening of the welding wire 42. In this position, the clamping means 50 are additionally latched via the cut-outs 54, 55 to the corresponding latching hooks 47, 48 of the base support 40. It must also be mentioned that the clamping means 50 are located in a protected manner in the fixed position in a hollow space of the clamping bodies 50.

The invention claimed is:

1. A sealing bar (22) for a vacuum drawer for vacuuming food, said sealing bar (22) having a base support (40) and at least one welding wire (42) extending in a longitudinal direction over a surface (45) thereof,
    the welding wire (42) being fastened to the base support (40) with a preload and contacting the base support (40) areally over a total length thereof,
    two clamping connections (50), a first clamping connection (50) at a first end side of the base support (40) and a second clamping connection (50) at a second end side of the base support (50), with said first and second clamping connections (50) fastening the welding wire (42) to the base support (40),
    the welding wire (42) being received by each said clamping connection (50) at the end side of the base support (50), with each said clamping connection (50) being releasably connectable to the base support (40), and
    each said clamping connection (50) comprising a hook (51) hung from the base support (40) at a location underneath the welding wire (42), with each said clamping connection (50) additionally being fixed to a lower side of the base support (40) below the surface (45) of the base support (40) and the hook (51) being hung at a transverse edge of the surface (45) of the base support (40).

2. A sealing bar (22) in accordance with claim 1, wherein the welding wire (42) is guided to the lower side of the base support (40) via the transverse edges of the base support (40) and is fixed to the lower side of the base support (40) by the clamping connection (50), with the welding wire (42) being guided with areal contact over at least one radius at an end side (56) of the base support (40).

3. A sealing bar (22) in accordance with claim 1, wherein the clamping connection is formed of an electrically conductive material.

4. A sealing bar (22) in accordance with claim 3, wherein the conductive material is metal.

5. A sealing bar (22) in accordance with claim 1, wherein the clamping connection (50) comprises a groove (53) into which the welding wire (42) is pressed by a pressing part (52) of the clamping connection (50).

6. A vacuum drawer having a vacuum chamber (20) and at least one sealing bar (22) in accordance with claim 1 supported in the vacuum chamber (20).

7. A sealing bar (22) for a vacuum drawer for vacuuming food, said sealing bar (22) having a base support (40) and at least one welding wire (42) extending in a longitudinal direction over a surface (45) thereof,
    the welding wire (42) being fastened to the base support (40) with a preload and contacting the base support (40) areally over a total length thereof,
    a clamping connection (50) at least at one end side of the base support (40) and fastening the welding wire (42) to the base support (40),
    the welding wire (42) being received by said clamping connection (50) at the end side of the base support (50), with the clamping connection (50) being releasably connectable to the base support (40), and
    the clamping connection (50) comprising a hook (51) hung from the base support (40) at a location underneath the welding wire (42), with the clamping connection (50) additionally being fixed to a lower side of the base support (40) below the surface (45) of the base support (40) and the hook (51) being hung at a transverse edge of the surface (45) of the base support (40),
    wherein the clamping connection (50) at the lower side of the base support (40) is fixable thereat by at least one one latching hook (47, 48) of the base support (40).

8. A sealing bar (22) in accordance with claim 7, wherein the clamping connection (50) additionally comprises cutouts (54, 55) for the respective latching hooks (47, 48),
    with one cutout (55) on an upper surface of the clamping connection (50) and the other cutout (54) on a normally-extending surface to the upper surface of the clamping connection (50).

9. A sealing bar (22) in accordance with claim 7, wherein the base support (40) comprises two latching hooks (47, 48),
    with one said latching hook (47) extending downwardly from a top of the base support (40) and the other said latching hook (48) extending upwardly from a bottom of the base support (40) and in a normal direction to said one latching hook (47), and
    the clamping connection (50) additionally comprises two cutouts (54, 55) for receiving the respective latching hooks (47, 48),
    with one said cutout (55) recessed from a top surface of the clamping connection (50) and the other said cutout (54) recessed from a normally-extending surface to the top surface of the clamping connection (50).

10. A sealing bar (22) for a vacuum drawer for vacuuming food, said sealing bar (22) having a base support (40) and at least one welding wire (42) extending in a longitudinal direction over a surface (45) thereof,
    the welding wire (42) being fastened to the base support (40) with a preload and contacting the base support (40) areally over a total length thereof,
    a clamping connection (50) at least at one end side of the base support (40) and fastening the welding wire (42) to the base support (40),
    the welding wire (42) being received by said clamping connection (50) at the end side of the base support (50), with the clamping connection (50) being releasably connectable to the base support (40), and
    the clamping connection (50) comprising a hook (51) hung from the base support (40) at a location underneath the welding wire (42), with the clamping connection (50) additionally being fixed to a lower side of the base support (40) below the surface (45) of the base support (40) and the hook (51) being hung at a transverse edge of the surface (45) of the base support (40),
    additionally comprising a frame part (25) to be situated on a side of the welding wire (42) opposite the base support (40), said frame part (25) comprising inner (33) and outer (34) walls, with adjacent inner (33) and outer (34) walls separated from one another by a gap, and the surface (45) of the base support (40) comprising a pair of projections (43) each defining a groove (44) with an adjacent side wall (41) of the base support (40) for receiving a respective inner wall (33) of the frame part (25) between the respective projection (43) and side wall (41).

11. A sealing bar (22) for a vacuum drawer for vacuuming food, said sealing bar (22) having a base support (40) and at least one welding wire (42) extending in a longitudinal direction over a surface (45) thereof, the welding wire (42) being fastened to the base support (40) with a preload and contacting the base support (40) areally over a total length thereof, a clamping connection (50) at least at one end side of the base support (40) and fastening the welding wire (42) to the base support (40), the welding wire (42) being received by said clamping connection (50) at the end side of the base support (50), with the clamping connection (50) being releasably connectable to the base support (40), and the clamping connection (50) comprising a hook (51) hung from the base support (40) at a location underneath the welding wire (42), with the clamping connection (50) additionally being fixed to a lower side of the base support (40) below the surface (45) of the base support (40) and the hook (51) being hung at a transverse edge of the surface (45) of the base support (40), wherein the clamping connection (50) at the lower side of the base support (40) is fixable thereat by one or more latching hooks (47, 48) of the base support (40), the clamping connection (50) additionally comprises cutouts (54, 55) for the respective latching hooks (47, 48), with one cutout (55) on an upper surface of the clamping connection (50) and the other cutout (54) on a normally-extending surface to the upper surface of the clamping connection (50), and the clamping connection (50) additionally comprises a groove (53) on a lower surface thereof into which the welding wire (42) is pressable by a plug (52) flexibly fastened to the clamping connection (50).

* * * * *